S. STEPHENS.
AUTO RIM.
APPLICATION FILED OCT. 13, 1916. RENEWED OCT. 16, 1919.
1,341,942.
Patented June 1, 1920.
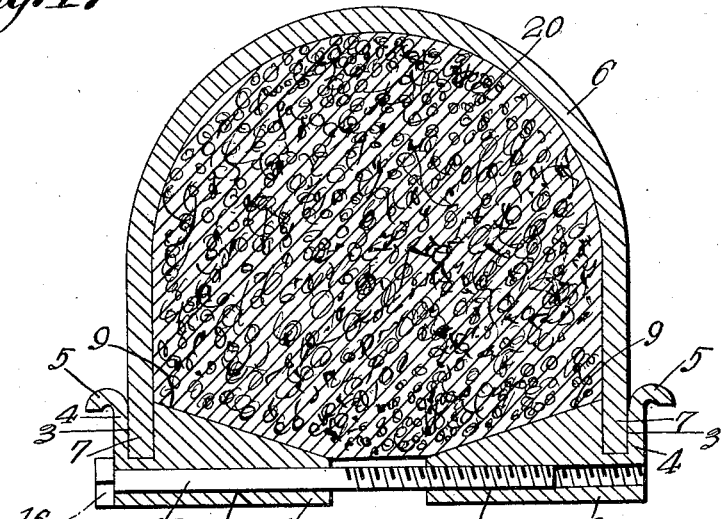
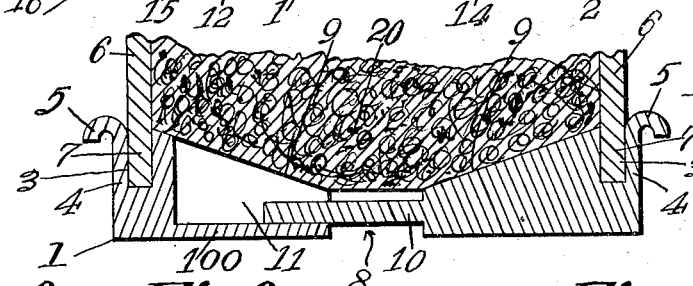
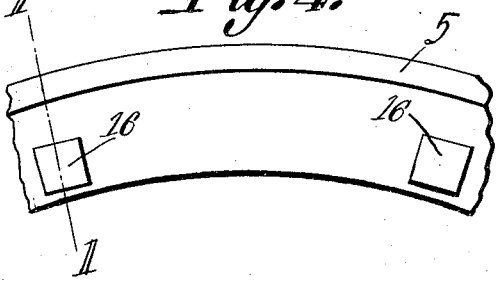
Witnesses
S. Stephens
Inventor
by C. A. Snow & Co.
Attorneys

UNITED STATES PATENT OFFICE.

STERLING STEPHENS, OF BUSHNELL, FLORIDA.

AUTO-RIM.

1,341,942.  Specification of Letters Patent.  Patented June 1, 1920.

Application filed October 13, 1916, Serial No. 125,426. Renewed October 16, 1919. Serial No. 331,240.

*To all whom it may concern:*

Be it known that I, STERLING STEPHENS, a citizen of the United States, residing at Bushnell, in the county of Sumter and State of Florida, have invented a new and useful Auto-Rim, of which the following is a specification.

The device forming the subject matter of this application is a rim, and the invention aims to provide novel means whereby pneumatic elements subject to puncture and deterioration may be dispensed with.

Another object of the invention is to provide novel means for compressing a filler which is located within the tire casing.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in cross section, a rim constructed in accordance with the present invention;

Fig. 2 is a cross section of the rim, parts being broken away;

Fig. 3 is a fragmental side elevation showing one of the rim forming members, the line 2—2 in Fig. 3 indicating approximately the cutting plane in which Fig. 2 is taken;

Fig. 4 is a side elevation showing the said rim forming member, the line 1—1 in Fig. 4 indicating approximately the cutting plane on which Fig. 1 is taken; and Fig. 5 is a fragmental cross section showing a modified form of the invention.

In carrying out the present invention there is provided a pair of continuous annular rim forming members 1 and 2. Adjacent their outer edges, the rim forming members 1 and 2 are equipped with circumscribing grooves 3 defining flanges 4 which may be turned over to form beads 5 adapted to prevent the rim-cutting of a casing 6, the edges 7 of which are received in the grooves 3. The casing 6 may be made out of rubber or a rubber compound, as is common in the art. The members 1 and 2 of the rim are spaced apart at their inner edges, as shown at 8. The members 1 and 2 of the rim are provided with inclined faces 9 which slant toward the median plane of the rim and toward the center of rotation of the rim. The member 2 of the rim has circumferentially spaced tongues 10. There may be any number of these tongues 10, but six of them will be found to be sufficient under ordinary circumstances. The member 1 of the rim is provided with recesses 11 in which the tongues 10 fit closely but slidably. In the member 1 of the rim are formed passages 12. These passages are not threaded. In the member 2 of the rim are formed passages 14, the passages 14 being threaded. A screw 15 is journaled in each of the passages 6 and is threaded into each of the passages 14, the screw 15 having a head 16 which bears against the outer lateral edge of the rim member 1. There may be any number of the screws 15, but six of them will prove ample. Located inside of the casing 6 is a filler 20 which may be made out of cork, sponge rubber or any other suitable substance having some compressibility and resiliency.

By rotating the screws 15, the rim members 1 and 2 may be advanced toward each other and then the slant faces 9, engaging the filler 20, will compress the same in the casing 6. The tongues 10, being received in the recesses 11, prevent relative circumferential creeping movement between the rim members 1, and likewise line up the passages 12 and 14 in the respective rim members to receive the screws 15.

In the modification shown in Fig. 5, one rim member appears at 25 and its slant face is shown at 26. The casing is delineated at 27. The rim member 25 has in inwardly extended clencher flange 28 adapted to engage a clencher bead 29 on the casing 27. Fig. 5 is introduced into the drawings for the purpose of showing that the invention may be applied with satisfactory results, irrespective of the means whereby the tire casing is connected with the members of the rim.

It is to be observed that the recesses 11 extend part way through the member 1, to form ledges 100 on which the transverse tongues of the member 2 are slidably supported. The tongues 10 fill the recesses 11 but partly, thereby to leave the recesses open adjacent the slant face 9 of the member 1. As a consequence, when the screws 15 are tightened up, parts of the compressible filler 20 will be forced into the open portions of the recesses 11, thereby to avoid a creeping of the filler.

Having thus described the invention, what is claimed is:—

A rim comprising opposed members provided adjacent their outer edges with casing-holding means and having their inner edges spaced, the said members having inclined faces which slant toward the median plane of the rim and toward the center of rotation of the rim, one of said members having transverse recesses opening through the slant face of said member and extended part way through said member to form ledges, the other of said members having transverse tongues slidably received in the recesses and supported on the ledges, the tongues filling the recesses but partly, thereby to leave the recesses open adjacent the slant face of the recessed member; a compressible filler supported on the slant faces of said members; a casing engaged with the casing holding means and housing the filler; and means for drawing said members together thereby to compress parts of the filler into the open portions of the recesses and to avoid a creeping of the filler.

In testimony that I claim the foregoing as my own, I have hereto affixed my signature in the presence of two witnesses.

STERLING STEPHENS.

Witnesses:
J. T. McCollum,
M. G. Potter.